United States Patent
Brady, Jr. et al.

(10) Patent No.: US 8,345,663 B2
(45) Date of Patent: Jan. 1, 2013

(54) DISTRIBUTED CABIN INTERPHONE SYSTEM FOR A VEHICLE

(75) Inventors: Kenneth A. Brady, Jr., Trabuco Canyon, CA (US); Gary Vanyek, Laguna Niguel, CA (US)

(73) Assignee: Thales Avionics, Inc., Irvine, CA (US)

( * ) Notice: Subject to any disclaimer, the term of this patent is extended or adjusted under 35 U.S.C. 154(b) by 1294 days.

(21) Appl. No.: 12/077,695

(22) Filed: Mar. 20, 2008

(65) Prior Publication Data

US 2008/0310609 A1 Dec. 18, 2008

Related U.S. Application Data

(60) Provisional application No. 60/907,182, filed on Mar. 23, 2007.

(51) Int. Cl.
*H04H 20/71* (2008.01)
*H04L 12/66* (2006.01)
*H04L 12/28* (2006.01)
*H04W 4/00* (2009.01)

(52) U.S. Cl. ........ 370/352; 370/312; 370/338; 370/390; 379/167.02; 455/414.1; 455/518; 455/519; 725/81; 725/82

(58) Field of Classification Search ........................ None
See application file for complete search history.

(56) References Cited

U.S. PATENT DOCUMENTS

| | | | |
|---|---|---|---|
| 2003/0095551 A1* | 5/2003 | Gotoh et al. | 370/395.3 |
| 2006/0026629 A1 | 2/2006 | Harris et al. | |
| 2006/0072469 A1* | 4/2006 | Tazaki | 370/242 |
| 2006/0095162 A1* | 5/2006 | Schafer et al. | 700/275 |
| 2006/0221962 A1* | 10/2006 | Previdi et al. | 370/390 |
| 2007/0002776 A1* | 1/2007 | Khare et al. | 370/260 |
| 2007/0147354 A1* | 6/2007 | He | 370/352 |
| 2008/0037580 A1* | 2/2008 | Shaffer et al. | 370/465 |

* cited by examiner

*Primary Examiner* — Hassan Phillips
*Assistant Examiner* — Lonnie Sweet
(74) *Attorney, Agent, or Firm* — Myers Bigel Sibley & Sajovec, P.A.

(57) ABSTRACT

In one aspect, cabin interphone handsets and passenger announcement speakers in the cabin of a vehicle communicate over an internet protocol data network. Each handset of the system has an internet protocol presence and each passenger announcement speaker of the system has an internet protocol presence. Each handset includes announcement and call management functions so that each handset can communicate with one or more handsets over the network as well as make passenger announcements via one or more passenger announcement speakers. The call setup function and PA function may utilize voice over internet protocol. In another aspect, methods are provided for making interphone calls and passenger announcements using the system.

14 Claims, 10 Drawing Sheets

DISTRIBUTED CABIN INTERPHONE SYSTEM FOR A VEHICLE

CROSS-REFERENCE TO RELATED PATENT APPLICATIONS

This patent application claims the benefit of U.S. Provisional Patent Application No. 60/907,182, filed Mar. 23, 2007.

FIELD OF THE INVENTION

The present invention pertains generally to communication systems and methods. More particularly, the present invention relates to interphone and passenger announcement systems and methods for vehicles such as aircraft, watercraft, and terrain traversing vehicles, including commercially operated passenger vehicles.

BACKGROUND OF THE INVENTION

Conventional communication systems on passenger vehicles (e.g., busses, vans, trains, aircraft, etc.) typically include a public address or passenger announcement (hereinafter PA) system for broadcasting communications such as announcements over one or more speakers installed in the vehicle cabin, and a separate cabin interphone system for the intra-cabin phone system, which the vehicle crewmembers (e.g., pilot/driver, cabin crew/flight attendants, etc.) use to communicate with each other. As shown in FIG. 1, the PA system 100 typically includes a central PA manager 120, a PA network 140 and a PA speaker 160 (although only one speaker 160 is shown, the PA system 100 may include additional speakers). The PA manager 120 handles the routing, distribution and prioritization of PA announcements so that announcements are broadcast via the PA network 140 and the PA speaker 160. Also as shown in FIG. 1, the interphone system 200 typically includes a central cabin interphone manager 220, an interphone network 240 and interphone handsets or stations 260 (although three stations, namely cockpit station 262, station 1 264 and station 7 266, are shown, the interphone system 200 may include fewer or additional stations). The interphone manager 220 performs a private automatic branch exchange (PABX) function so that vehicle crewmembers may communicate with each other by establishing cabin interphone calls via the interphone network 240 and stations 260. Since all of the audio routing, mixing, and distribution is performed by these centralized managers 120, 220, if one or both of the managers 120, 220 were to fail, the respective PA and interphone systems 100, 200 would cease functioning. Accordingly, duplicate managers 120, 220 as well as other redundant hardware must be provided in the vehicle to assure an acceptable level of overall system reliability.

The cabin interphone handsets 260 are typically located in various crew work areas or crew seating areas (including crew rests if applicable). These handsets 260 are connected through the cabin interphone network 240 (e.g., a wired network of twisted pair cables or the like) to a cabin interphone manager 220 that serves a function similar to a PABX or call-processing switch for a terrestrial telephone system.

As shown in FIG. 2, when a call is to be placed from one handset to another handset in the conventional system, a dial code is entered into the originating handset (e.g., "station 7" 266 as shown) and routed to the cabin interphone manager 220. The cabin interphone manager 220 receives the call setup request from the originating handset and performs call setup operations similar to what is performed by a switch of a plain old telephone system (POTS) by providing signals to the destination handset (e.g., "station 1" 264 as shown) to cause the destination handset to "ring." Once the destination handset is picked up, the cabin interphone manager 220 switches or bridges the two handsets together and routes the audio signal from the originating handset to the destination handset and vice versa. This is essentially the same call setup/processing function that a terrestrial PABX performs to facilitate audio communication between two telephones. Every sample of audio is passed through and handled by the cabin interphone manager 220 and a failure of the cabin interphone manager 220 results in a total failure of the interphone system 200.

A PA system 100 typically accepts audio inputs from the handsets 260 (e.g., cockpit station 262) of the cabin interphone system 200 to create the audio for passenger announcements. Also, as shown in FIG. 3, the PA system 100 may accept audio from an entertainment system 300 (e.g., an audio/video system such as an in-flight entertainment system) so that in-vehicle video such as movies, etc. provided for passenger entertainment or information includes broadcast audio via the PA network 140 and speaker 160. The PA system 100 may also provide an audio feed and annunciation indication to any entertainment system 300 to cause entertainment pause and/or audio override. In conventional systems, entertainment pause and/or audio override is handled by the centralized PA manager 120. When an announcement for broadcast over the speaker 160 originates from a cabin interphone handset 260, the audio from the PA "call" is rerouted from the cabin interphone manager 220 to the PA manager 120 for distribution to overhead speakers 160.

That is, in the conventional system shown in FIG. 3, when a passenger announcement is to be initiated from a cabin interphone handset 260, a dial code for the PA system 100 is entered into the originating handset (e.g., "station 1" 264 as shown), the cabin interphone manager 220 informs the PA manager 120 of the request, and connects the audio signal from the originating handset to the PA manager 120. The PA manager 120 then distributes the audio received from the cabin interphone manager 220 to the appropriate overhead speaker or speakers. A "Push-to Talk" (PTT) button may be used on the handset 260 to trigger the announcement on and off.

In the conventional system as described and shown in FIGS. 1-3, the foregoing interphone and PA approaches cause the audio signal to pass through and be processed or routed by a number of different pieces of equipment. This has forced vehicles to have redundant hardware (e.g., a PA network consisting of first wiring and an interphone network consisting of second wiring), thereby increasing the vehicle weight and decreasing the vehicle's usable interior space.

BRIEF DESCRIPTION OF THE DRAWINGS

The accompanying drawings, which are incorporated herein and constitute part of this specification, illustrate various example embodiments of the invention, and together with the general description given above and the detailed description given hereinafter, serve to explain features of the invention.

DETAILED DESCRIPTION

Figure 4:
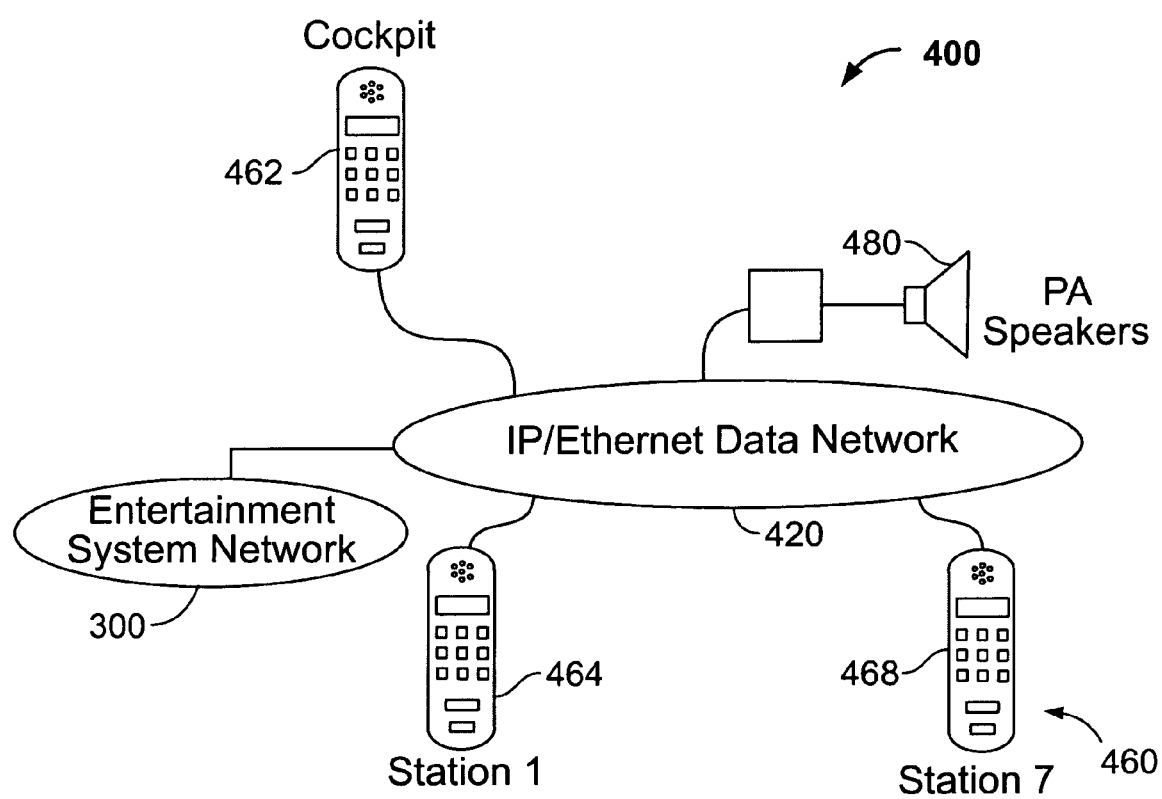
FIG. 4 is a schematic diagram of an example communications system for a vehicle according to an embodiment of the present invention.

Referring now to FIGS. 4-10, communication systems and methods for a vehicle will be described. As shown in FIG. 4, a communication system 400 for a vehicle includes a data network 420, PA/interphone handsets or stations 460 (including three stations as shown, namely "cockpit" 462, "station 1" 464, and "station 7" 468), and a PA speaker 480. In the illustrated embodiment of system 400, an entertainment system 300 is shown to be in communication with the communication system 400, however, the present systems and methods are not limited to being in communication with the entertainment system 300. The data network 420 as shown may be a network of the IP/Ethernet type such as a wired LAN or WAN or a wireless network (e.g., using IEEE 802.11 protocol or the like known in the art). The PA/interphone handsets or stations 460 include PA and call management functions so that, by using the communication system 400, crewmembers onboard a vehicle may communicate with each other using a distributed interphone function of the system 400 as well as make announcements to vehicle passengers using a distributed PA function of the system 400.

Figure 1:
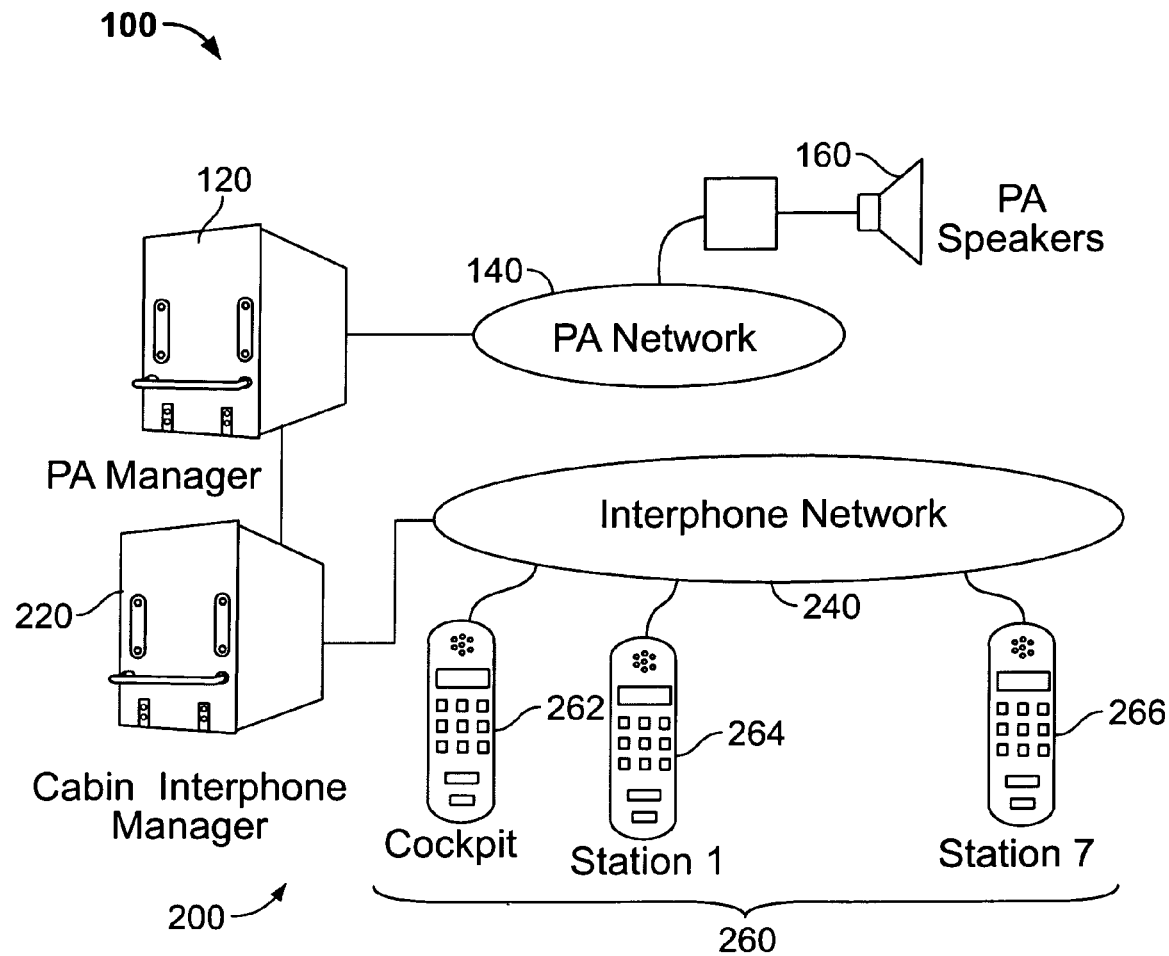
FIG. 1 is a schematic diagram illustrating conventional cabin interphone and PA systems.
Figure 2:
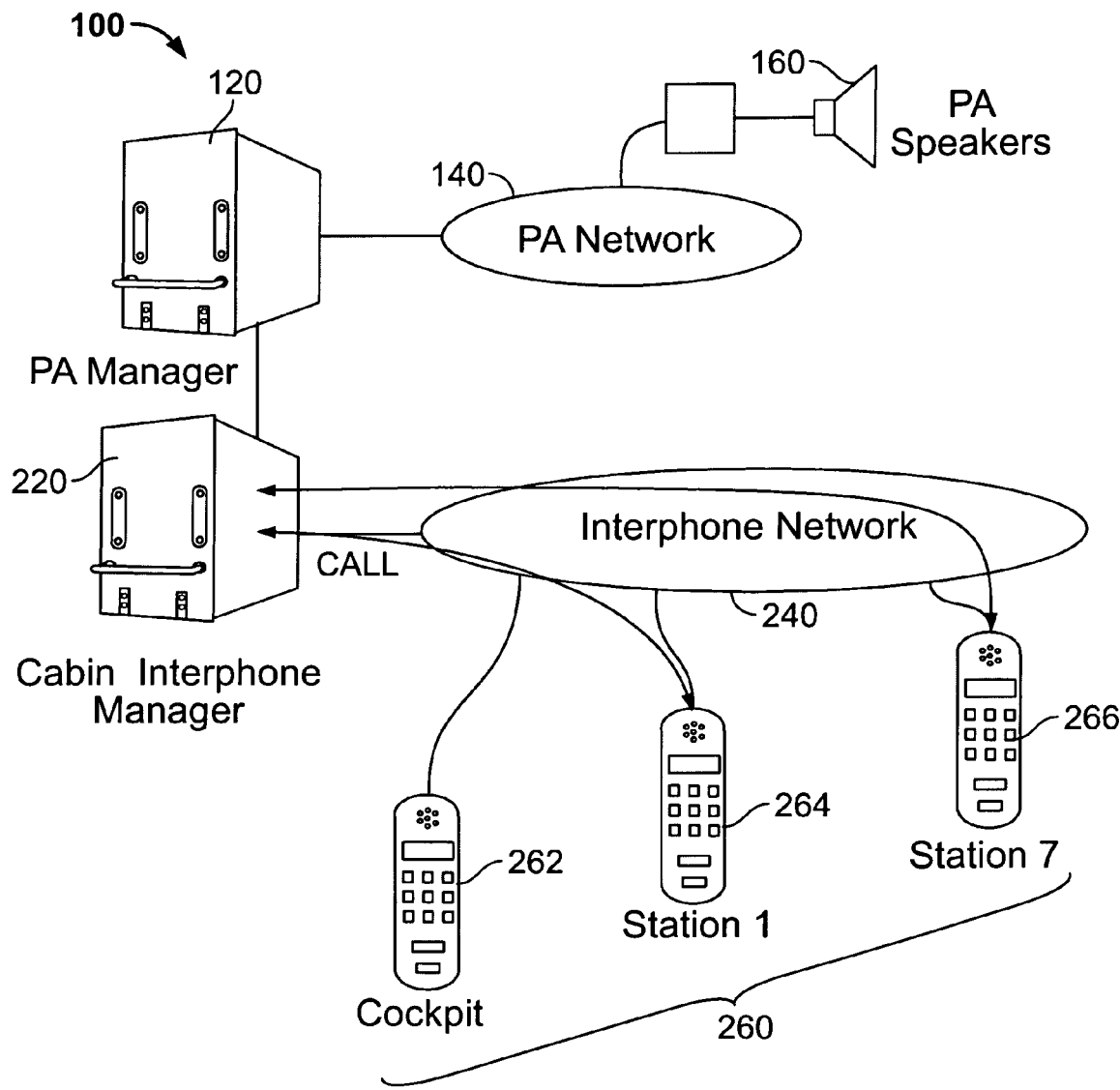
FIG. 2 is a schematic diagram illustrating a station to station call according to the conventional cabin interphone and PA systems shown in FIG. 1.
Figure 3:
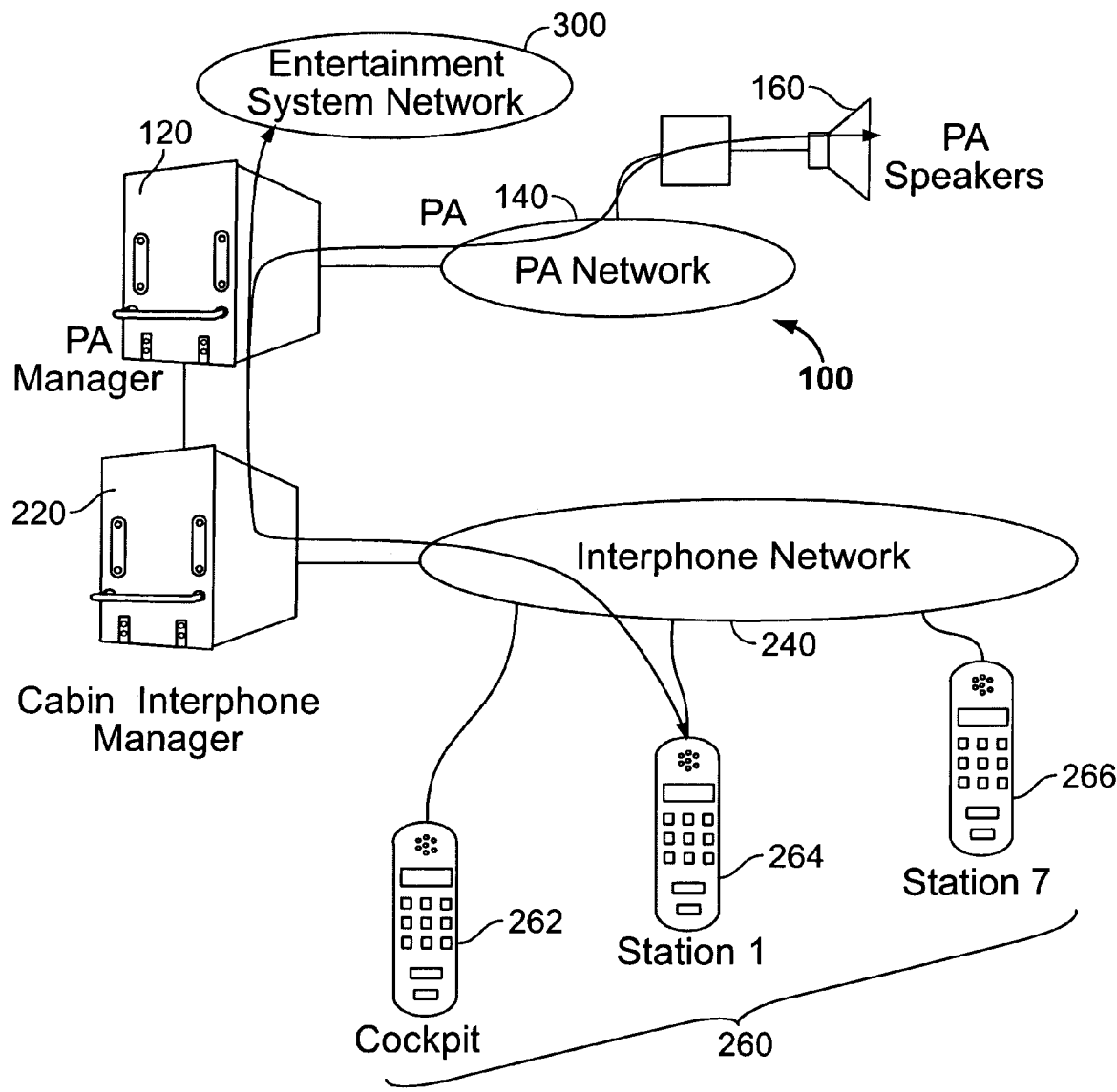
FIG. 3 is a schematic diagram illustrating a passenger announcement according to the conventional cabin interphone and PA systems shown in FIG. 1.

The stations 460 are nodes of the network 420 and each station has a controller (e.g., a microprocessor) operable for executing PA and call management function, a memory for storing a unique address, etc., and a communication interface. Addresses of the stations 460 may be predetermined/static (e.g., fixed IP addresses) or programmable/changeable (e.g., IP addresses assigned using DHCP protocol or the like). The PA/call management function of each station is configured to manage (i.e., set up/establish and tear down/terminate) interphone calls as well as manage a PA function of the system 400. As can be appreciated from FIGS. 4-10, the PA/call management function of each station is a logical software function as opposed to a fixed physical unit such as the cabin interphone manager 220 and PA manager 120 shown in FIGS. 1-3. By distributing the PA/call management function among the stations 460, single point failure or serial failure mode of the interphone and PA functions are obviated. Accordingly, the handsets 460 include intelligence so that they can communicate with each other in point-to-point and/or point-to-multipoint type manner over the network 420. For example, each handset may have a data structure (e.g., database, table, etc.) with addresses (e.g., IP addresses, URLs, etc.) of the other handsets and speakers 480 so that each handset can establish communication with and route signals, packets and other communications to various devices of the system 400 over the network 420. Each handset may periodically, intermittently or continuously monitor the network 420 for status indications (e.g., busy, idle, registering, dead, etc.) of other handsets and nodes (e.g., speakers 480). For example, when a handset is connected to the network 420 as a node, the handset is operable to identify itself to the network 420 and can establish an address (e.g., an IP address or host name if DNS is being used). After establishing or changing its address, the handset or network 420 may communicate with the other handsets so that data structures of each handset are updated to include the new and/or changed addresses. In this way, each handset may request a direct connection to each one or more of the other handsets.

Figure 5:
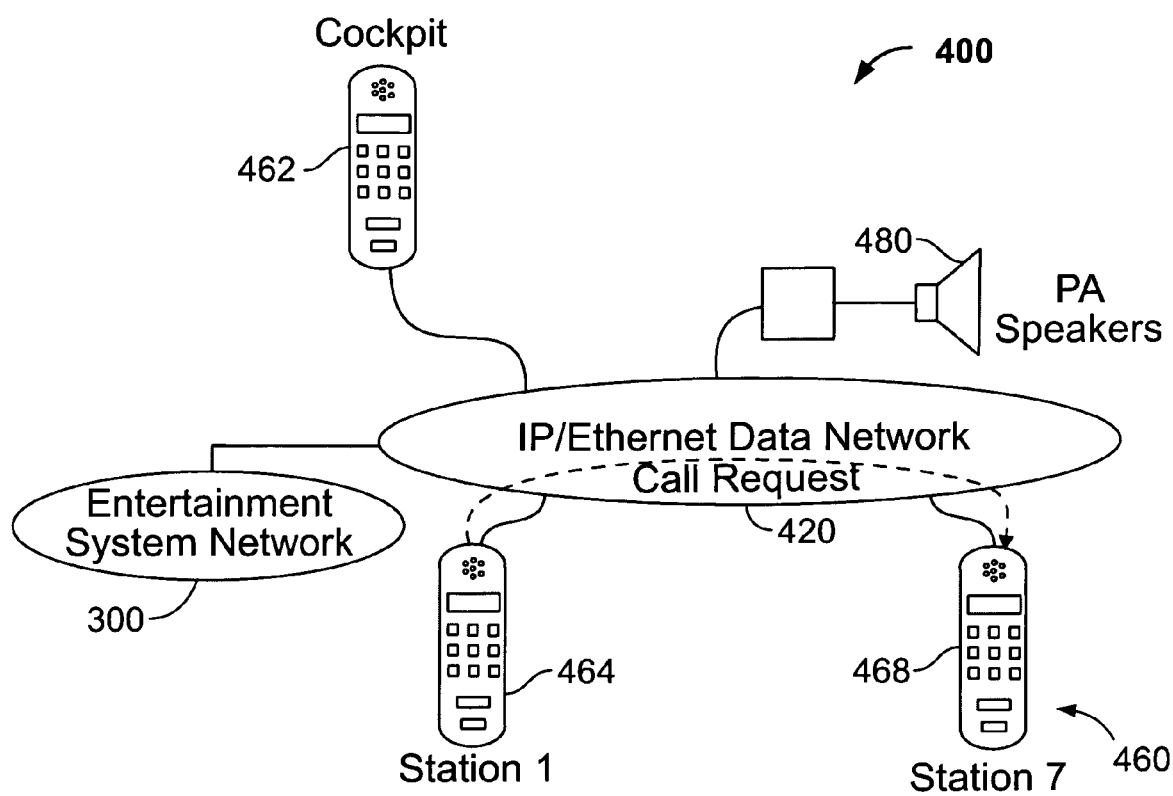
FIG. 5 is a schematic diagram illustrating a station to station call request according to the communications system shown in FIG. 4.
Figure 6:
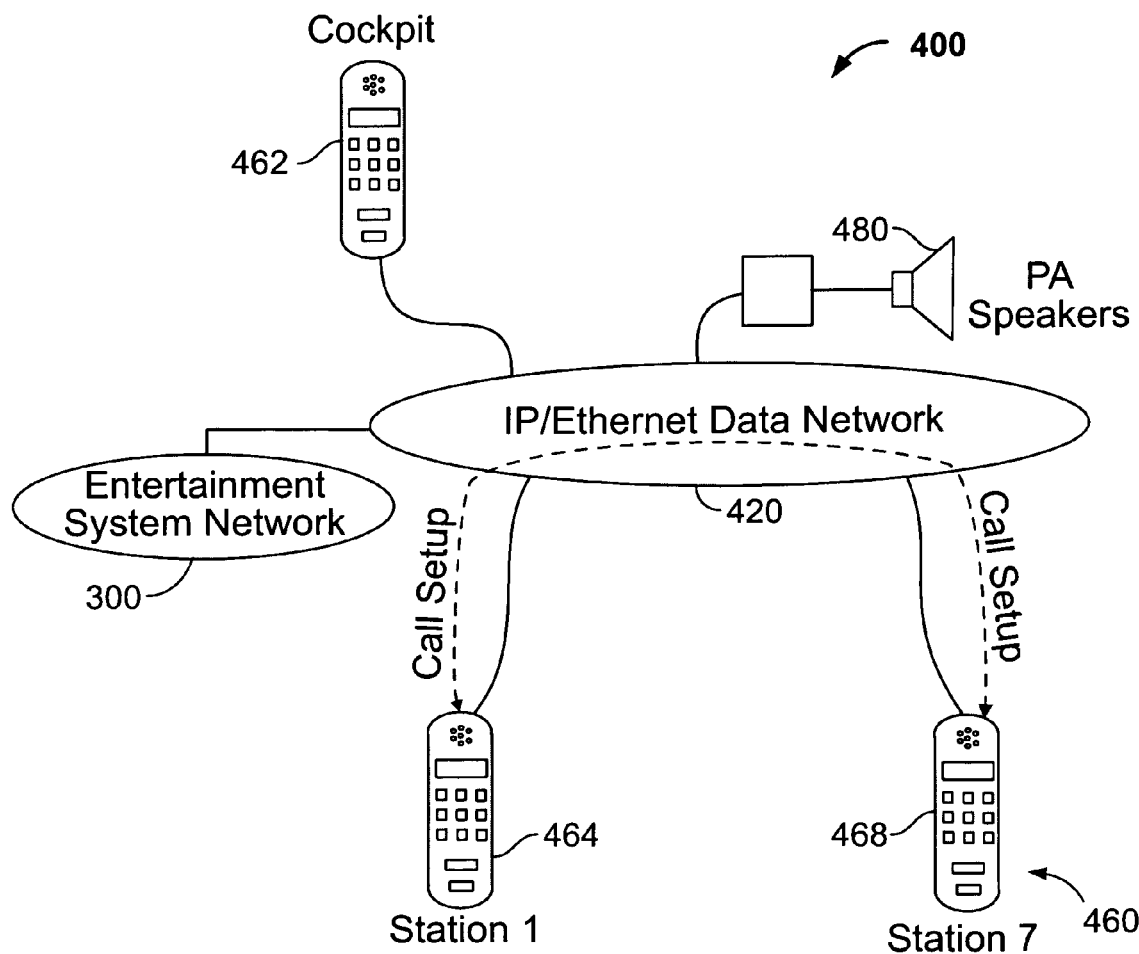
FIG. 6 is a schematic diagram illustrating a station to station call setup/acknowledgement according to the communications system shown in FIG. 4.
Figure 7:
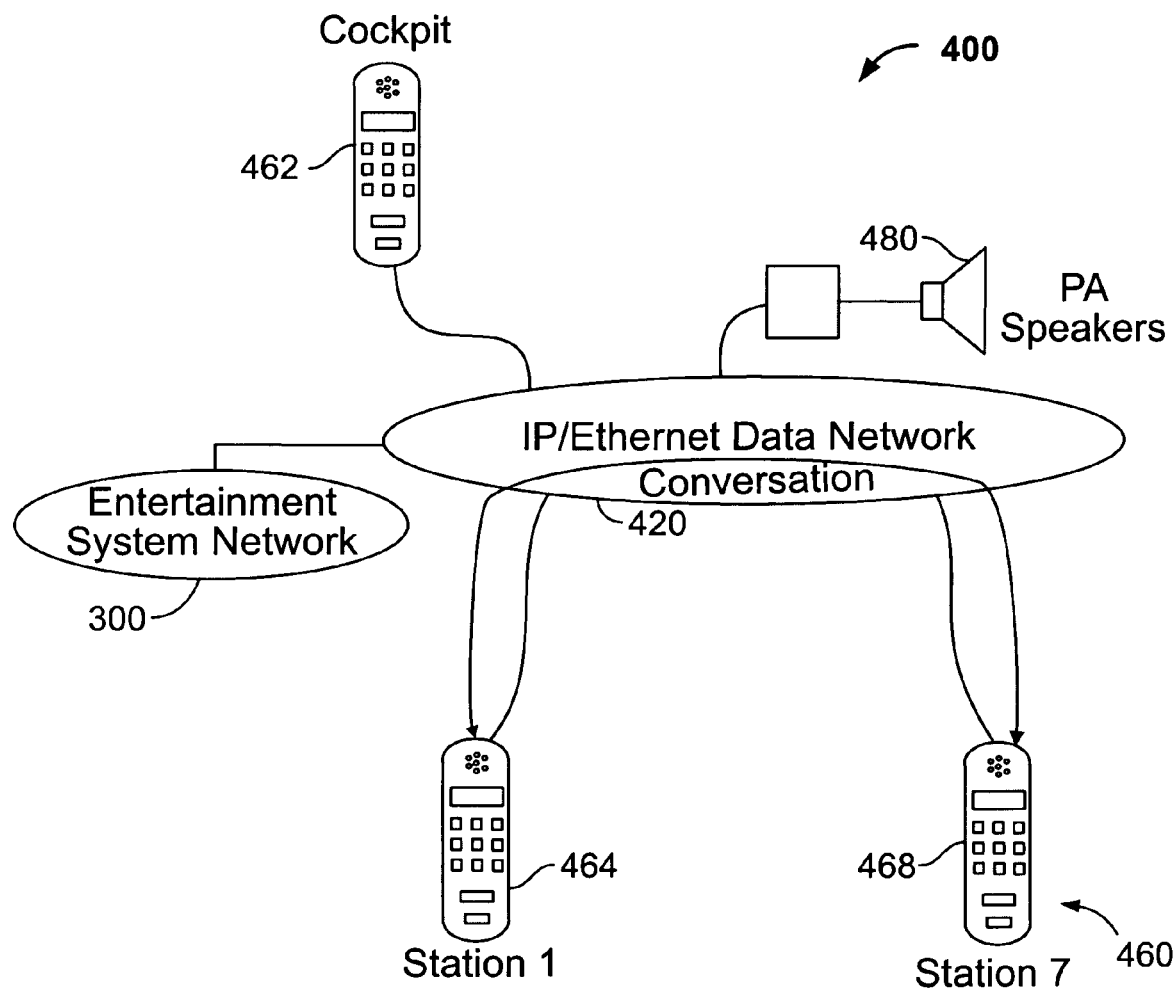
FIG. 7 is a schematic diagram illustrating a station to station call according to the communications system shown in FIG. 4.

As shown in FIG. 5, when an interphone call is to be placed from one handset to another, a dial code (e.g., "Call Request" as shown) is entered into the originating handset (station 1 464 as shown) by a user actuating a user input (e.g., buttons, switches, a keypad, etc.). A controller of the handset is in communication with the user input for receiving the dial code, and when the dial code is received by the controller a PA/call management function of the handset processes the dial code to determine a call destination address (or addresses) and begins to set up a call. The call set up process may include a handshake which occurs between the two handset addresses. For example, the handsets 460 may utilize session initiation protocol (SIP) or other protocol known in the art. The call setup function would signal the destination handset of the incoming call (see FIG. 6) and, upon acceptance of the call request, after handshaking, etc. the handsets would use the appropriate internet protocol (IP) addresses for communications to each other (see FIG. 7). Once the call is set up a conversation may take place using voice over IP (VoIP) type protocol such that audio is packetized, addressed and routed over the network 420 so that communication takes place directly between the two handsets. There is no need for dedicated hardware to perform audio sample processing and routing. That function is handled by the handsets 460 and IP network 420.

Additional functionality of the system 400 such as, for example a group or party line, can be accommodated. There are several ways in which a party line call could be accomplished. In one embodiment, a party-line IP address is established and all handsets may participate in the party line by transmitting to that address. In another embodiment, a party line is established by using IP multicast between desired or otherwise selected handsets. That is, each participating handset duplicates packets of each unicast call from that handset and distributes the duplicated packets to other participating handsets. Each handset would receive the VoIP packets from the other handsets participating in the-party line, sum the audio samples (scaling to prevent clipping and handling sidetone as needed), and present the resulting audio to the handset speaker.

Figure 8:
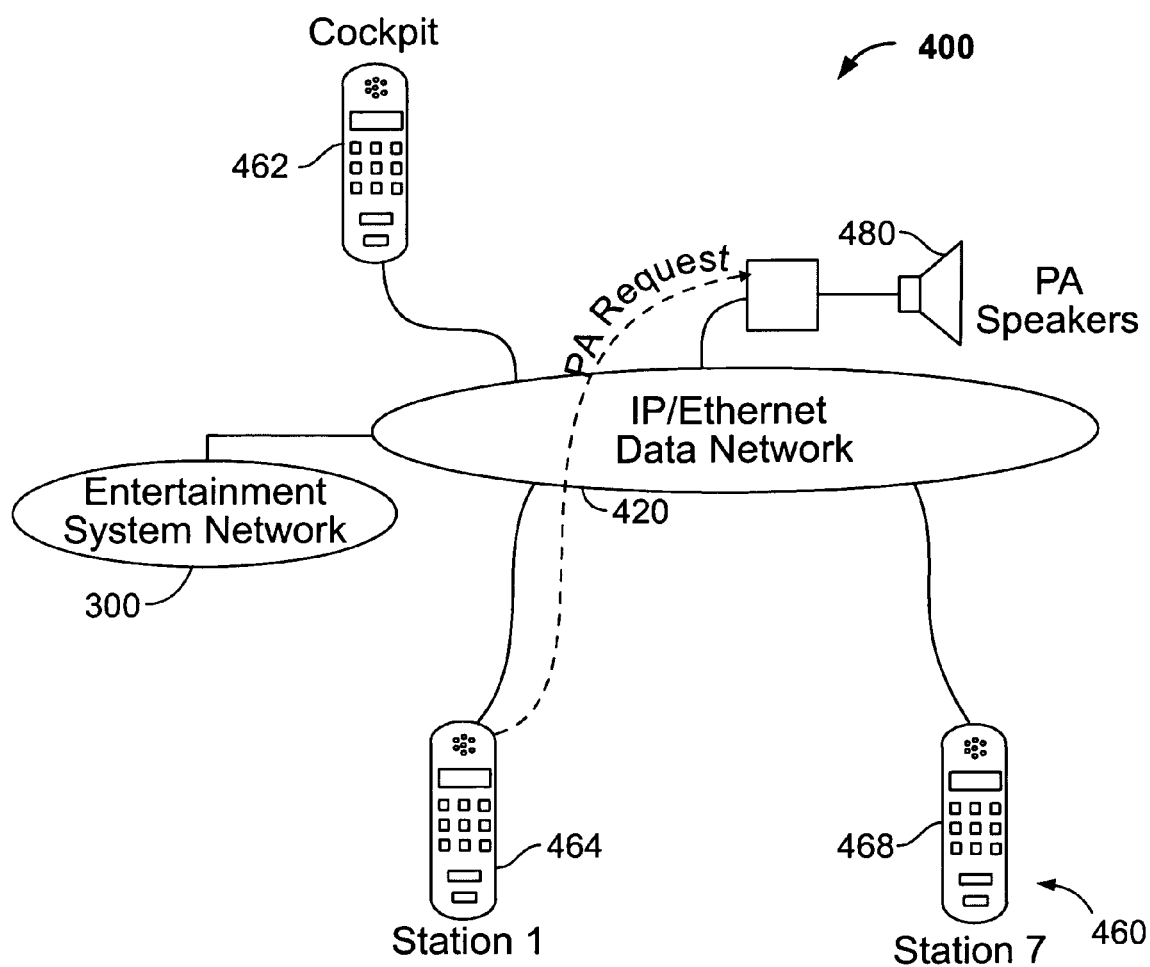
FIG. 8 is a schematic diagram illustrating a request to make a passenger announcement according to the communications system shown in FIG. 4.
Figure 9:
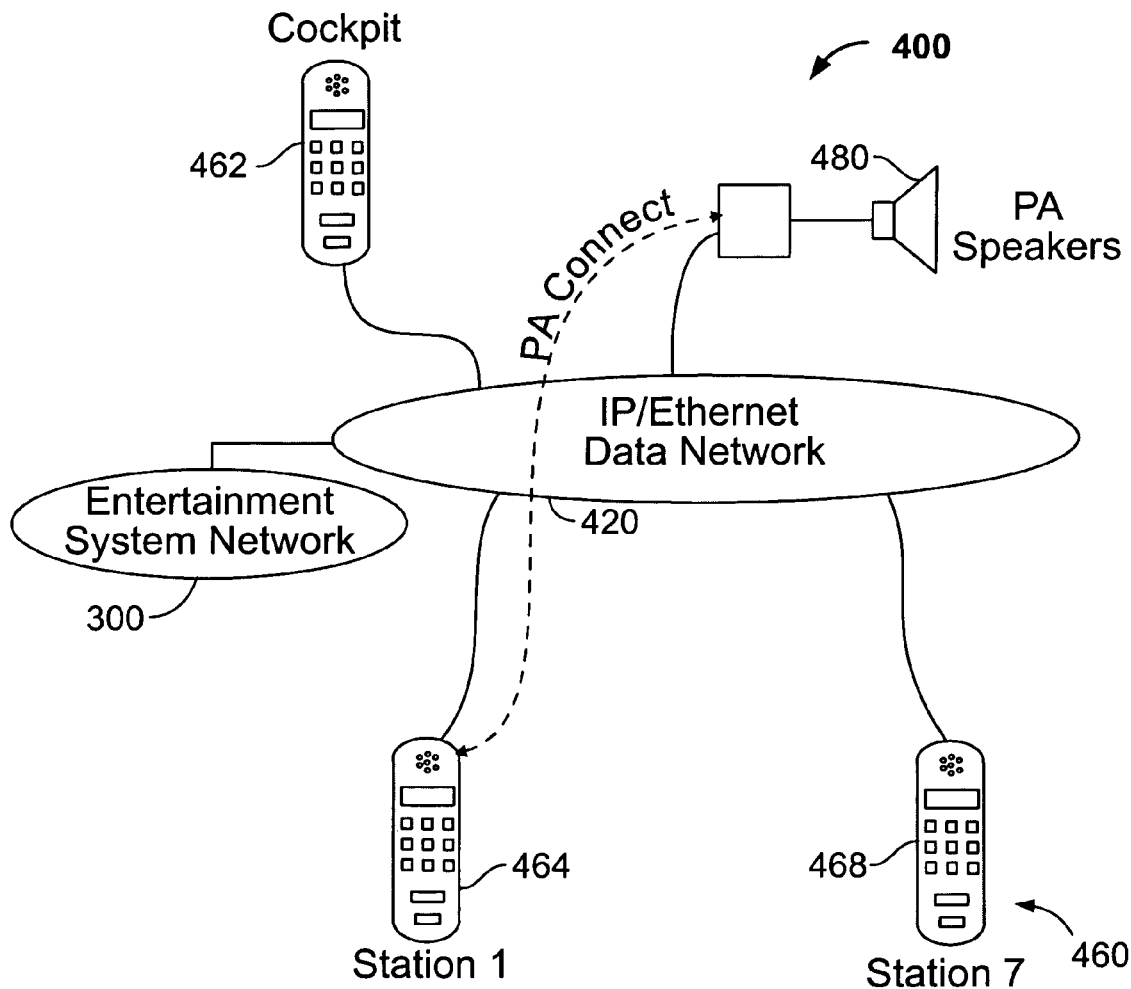
FIG. 9 is a schematic diagram illustrating a connection for passenger announcement according to the communications system shown in FIG. 4.
Figure 10:
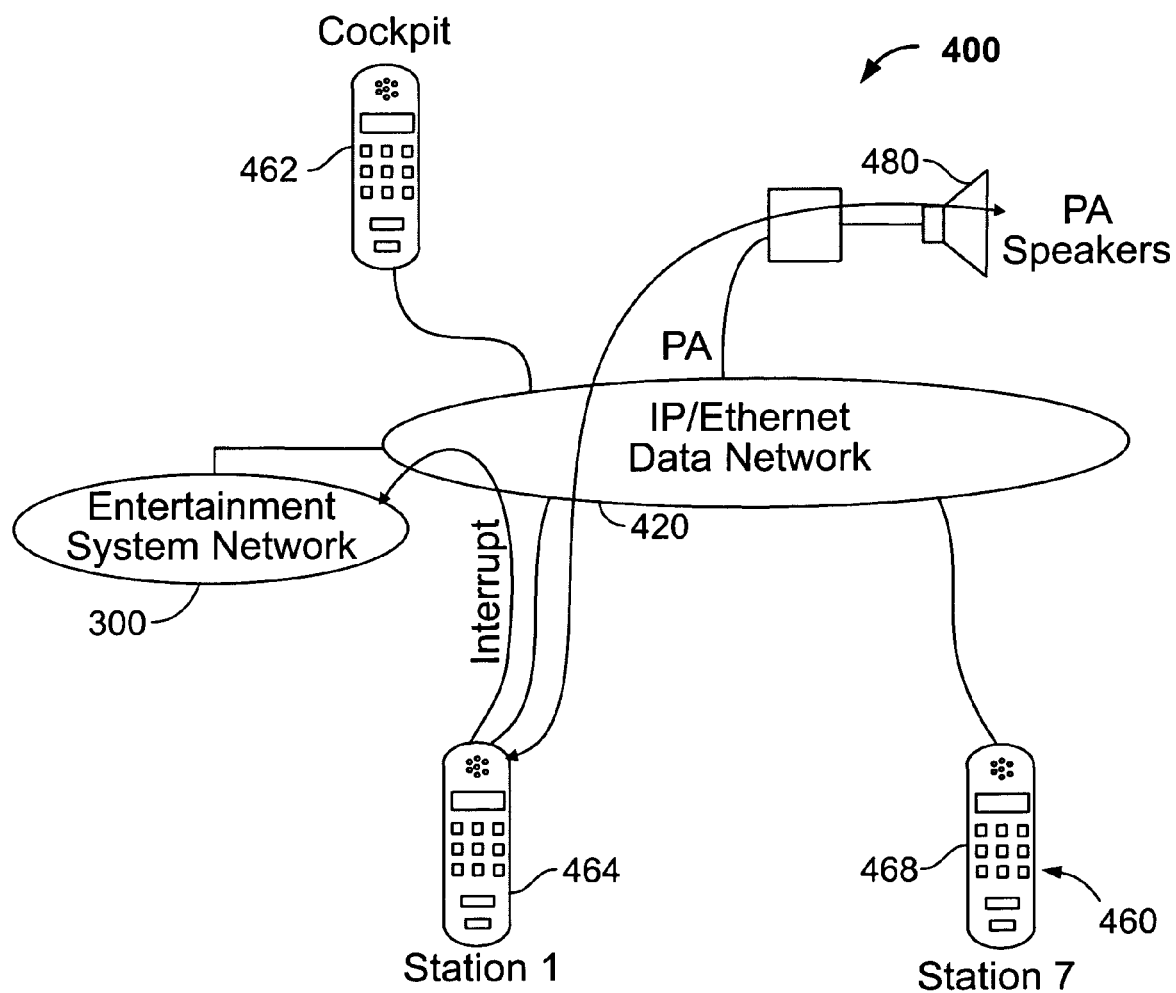
FIG. 10 is a schematic diagram illustrating a passenger announcement according to the communications system shown in FIG. 4.

Turning now to FIGS. 8-10, a PA function of the system 400 will be described. As shown in FIG. 8, when a passenger announcement is to be initiated from a cabin interphone handset (e.g., station 1 464 as shown), a dial code (e.g., "PA Request" as shown which is the PA address such as an IP address, URL, etc.) for a speaker 480 or speakers of interest is entered into the originating handset and transferred by the handset across the network 420 and directly to the PA speaker 480. Next, as shown in FIG. 9, the PA/call management function of the handsets 460 sets up the handset (e.g., station 1 464 as shown) and speaker 480 to communicate with each other. The PA/call management function may initiate handshaking between the handset and the speaker 480 so that the handset can communicate with one or more destination speakers 480 to prepare the one or more destination speakers 480 for receiving packetized VoIP data from one or more handsets. In some embodiments, the PA/call management function of the handsets 460 may perform authentication and/or authorization operations known in the art (e.g., entering an alphanumeric password, etc.) to prevent unauthorized persons from making announcements.

Once the handset and speaker 480 are set up by the PA/call management function for making an announcement (as shown in FIG. 9), audio received by the handset is packetized, addressed and routed over the network 420 so that communication takes place directly between the handset and one or more speakers 480. As previously mentioned, the handsets 460 and/or the PA/call management function may include data structures such as databases, tables, etc. that include speaker addresses (e.g., IP address, URL, etc.) so that announcements may be made to selected areas of the vehicle cabin or otherwise directed to particular passengers, that is, passengers being proximate to one or more speakers. Similarly, in some embodiments, the speaker 480 may include a data structure that associates a priority with a handset address. However, in other embodiments, priority can be based on a parameter either implicitly in the source IP address, the IP packet headers or explicit using some other network parameter such as port number. In an example, the speaker 480 may include priority logic and PA (e.g., packetized announcement) decoders, so each speaker 480 can pick and choose between various announcement streams of different priority. In this way, the speaker 480 can determine that one or more handsets or streams may have higher priority and override announcements/streams being made via other lower priority handsets. In some embodiments an auxiliary interface component may be used (e.g., in the speaker 480) to decode other sources. Such an auxiliary interface may facilitate the generation of a "call" or announcement based on a keyline. Chimes and tones can also be employed using an additional message type that can be decoded at the speaker 480.

Furthermore, in some embodiments the data structures may group or associate a number of addresses to define announcement zones. For example, using the data structures of addresses, announcements may be made according to passenger seating areas such as first class, business class, economy class, etc. so that each class can receive a customized announcement. In some instances the announcement zones (i.e., various speaker addresses) may be defined using a multicast IP address specific for the various speakers configured in the area to which the announcement is to be directed. Using the data structure with point-to-point/peer-to-peer and/or multicast IP addresses, the PA/call management function of each handset is operable to automatically distribute packetized VoIP audio to one or more speaker 480 (see FIG. 10). Furthermore, when the system 400 is in communication with the entertainment system 300, the audio may be distributed from one handset (e.g., station 1 464 as shown) to one or more headphone jacks of the entertainment system 300 so that announcements may override, interrupt, pause or otherwise take priority over entertainment media being provided to one or more passengers.

PA requests and/or the handsets themselves may include a priority identifier so that some less important announcements may be interrupted by announcements having higher importance. In one embodiment, packets sent from the cockpit handset 462 are configured with a high priority flag so that priority calls from the flight deck relating to, for example delays, weather conditions, turbulence, can be made to all passengers by interrupting other announcements or entertainment. In this embodiment, all devices receiving packets originating from cockpit handset 462 recognize the priority flag and reject or ignore packets from a lower priority source. Once the high priority source stops transmitting packets, the packet flow from the lower priority source can be automatically honored without complicated setup, teardown, and multiplexing operations. In some cases, the lower priority packets may be buffered so that the announcement may continue without packet loss after the high priority interruption. In other embodiments, each packet-receiving device may include or be in communication with a priority data structure (e.g., an address-priority lookup table) so that the receiving device can determine which announcement to annunciate or otherwise provide to passengers. However, in further embodiments, priority can be based on a parameter either implicitly in the source IP address, the IP packet headers or explicit using some other network parameter such as port number.

As can be appreciated, in some embodiments of the present system, communication between interphones and terrestrial-based parties is facilitated. For example, the system 400 may be coupled with a transceiver/antenna combination that is configured to communicate with at least one of a terrestrial-based wireless service (e.g., GSM, CDMA, TDMA, AMPS etc. cellular network) and a satellite-based wireless network (e.g., low earth orbiting network).

In accordance with an aspect of an embodiment of the invention, there is provided an IP data network including a plurality of nodes being a vehicle cabin's interphone handsets and PA speakers are attached. Each handset has an IP presence and each PA speaker has an IP presence.

In accordance with another aspect of an embodiment of the invention, there is provided (VoIP) technology for both the vehicle cabin's interphone service as well as the PA service.

In accordance with yet another aspect of an embodiment of the invention, there is provided a call setup function that becomes a logical, location independent function that can be accomplished in centralized servers or distributed among the interphone equipment itself.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments of this invention are described herein. It should be understood that the illustrated embodiments are exemplary only, and should not be taken as limiting the scope of the invention.

What is claimed is:

1. A communication system for a vehicle, comprising:
an internet protocol network;
a plurality of passenger announcement speakers in communication with the internet protocol network, each passenger announcement speaker of the plurality including an internet protocol presence; and
a plurality of interphone handsets in communication with the internet protocol network, each interphone handset of the plurality including an internet protocol presence and a communication function,
wherein the communication function manages announcements from the interphone handset to at least one passenger announcement speaker of the plurality by accessing a data structure within the interphone handset to look up an IP address for each of the at least one passenger announcement speaker and communicating the IP address for each of the at least one passenger announcement speaker with the announcement to the at least one passenger announcement speaker, and
wherein the plurality of passenger announcement speakers are configured in zones, each zone being defined by subsets of passenger announcement speakers of the plurality of passenger announcement speakers, and the data structure accessed by the communication function further includes information defining which of the IP addresses of the passenger announcement speakers are grouped within which of the zones.

2. The system of claim 1, wherein the data structure accessed by the communication function includes multicast IP addresses that define which of the passenger announcement speakers are grouped in each of the subsets.

3. The system of claim 1 wherein each passenger announcement speaker of the plurality of passenger announcement speakers includes a data structure for associating each interphone handset of the plurality with a priority value, the communication function of each passenger announcement speaker selecting one announcement of two or more received announcements for annunciation based on priority values of the two or more received announcements.

4. The system of claim 1 wherein the internet protocol network is in communication with an entertainment system that provides entertainment content to passengers on the vehicle, the communication function of each interphone handset being configured to interrupt the entertainment content during announcements.

5. A method of making passenger announcements on a vehicle, the vehicle including a plurality of interphone handsets and a plurality of passenger announcement speakers, the method comprising:
managing an announcement, by a communication function of one of the interphone handsets, to at least one passenger announcement speaker of the plurality by:
accessing a data structure within the interphone handset to look up an IP address for each of the at least one passenger announcement speaker; and
communicating the IP address for each of the at least one passenger announcement speaker with the announcement to the at least one passenger announcement speaker,
wherein the plurality of passenger announcement speakers are configured in zones, each zone being defined by subsets of passenger announcement speakers of the plurality of passenger announcement speakers, and the data structure accessed by the communication function to manage announcements further includes information defining which of the IP addresses of the passenger announcement speakers are grouped within which of the zones.

6. The method of claim 5 wherein the step of managing an announcement comprises:
packetizing audio received by the one of the interphone handsets; and
routing audio packets from the one of the interphone handsets to a plurality of the passenger announcement speakers responsive to IP addresses with the announcement from the one of the interphone handsets.

7. The method of claim 6 wherein the packetizing step comprises assigning an annunciation priority to the audio packets by operation of the one of the interphone handsets.

8. The method of claim 7 wherein the assigning step comprises outputting the audio packets from a predetermined port number by operation of the one of the interphone handsets.

9. The method of claim 5 further comprising:
comparing priorities of first and second ones of the announcements received by one of the passenger announcement speakers from corresponding first and second ones of the plurality of interphone handsets, by operation of the one of the passenger announcement speakers; and
responsive to the comparing step, annunciating one of the first and second passenger announcements having a higher priority.

10. The method of claim 5 further comprising, substantially simultaneously with the annunciating step, interrupting entertainment content being provided to passengers from an entertainment system.

11. The system of claim 3, wherein the communication function of each passenger announcement speaker is configured to buffer at least one of the non-selected received announcements, and to play the buffered at least non-selected received announcements through the passenger announcement speaker after completion of playing of the selected received announcement.

12. The method of claim 9 further comprising:
buffering the other one of the first and second passenger announcements having the lower priority while the higher priority one of the first and second passenger announcements is annunciated; and
annunciating the lower priority one of the first and second passenger announcements after completing annunciation of the higher priority one of the first and second passenger.

13. The system of claim 1 wherein the communication function of each passenger announcement speaker selects one announcement of two or more received announcements for annunciation based on comparison of source IP addresses of the two or more received announcements.

14. The method of claim 9 further comprising:
determining which of the first and second passenger announcements has the high priority responsive to comparison of source IP addresses of the first and second passenger announcements by operation of the one of the passenger announcement speakers.

* * * * *

UNITED STATES PATENT AND TRADEMARK OFFICE
CERTIFICATE OF CORRECTION

PATENT NO. : 8,345,663 B2  
APPLICATION NO. : 12/077695  
DATED : January 1, 2013  
INVENTOR(S) : Brady, Jr. et al.

It is certified that error appears in the above-identified patent and that said Letters Patent is hereby corrected as shown below:

In the Claims:

Column 8, Line 16:
    Please correct "responsive to IP addresses with the"
        to read -- responsive to the IP addresses communicated with the --

Signed and Sealed this
Twenty-first Day of May, 2013

Teresa Stanek Rea
*Acting Director of the United States Patent and Trademark Office*